(12) United States Patent
He

(10) Patent No.: US 12,187,103 B1
(45) Date of Patent: Jan. 7, 2025

(54) RIB TAIL-END CONNECTOR FOR AUTOMOBILE SUNSHADE

(71) Applicant: Chaote Han, Zhejiang (CN)

(72) Inventor: Xianquan He, Zhejiang (CN)

( * ) Notice: Subject to any disclaimer, the term of this patent is extended or adjusted under 35 U.S.C. 154(b) by 0 days.

(21) Appl. No.: 18/764,265

(22) Filed: Jul. 4, 2024

(30) Foreign Application Priority Data

Dec. 21, 2023 (CN) .......................... 202323497345.6

(51) Int. Cl.
*B60J 1/20* (2006.01)
*B60J 3/02* (2006.01)

(52) U.S. Cl.
CPC .................................. *B60J 3/0213* (2013.01)

(58) Field of Classification Search
None
See application file for complete search history.

(56) References Cited

U.S. PATENT DOCUMENTS

| 6,135,191 A * | 10/2000 | Mitchell | B60J 1/2011 |
| | | | 160/370.21 |
| 6,357,461 B1 * | 3/2002 | Chai | B60J 1/2091 |
| | | | 135/147 |
| 2019/0217686 A1 * | 7/2019 | Mondragón | B60J 1/2091 |

* cited by examiner

*Primary Examiner* — Joseph D. Pape
(74) *Attorney, Agent, or Firm* — Hawaii Patent Services; Nathaniel K Fedde; Kenton N. Fedde

(57) ABSTRACT

A rib tail-end connector of an automobile sunshade comprises a connector, wherein the connector is bendable; one surface of the connector is provided with a butting convex part which is used for butting with the ribs; the butting convex part comprises an insertion part and a installation part, wherein the insertion part is used for insertion of the rib, and an elastic member is installed inside the installation part.

18 Claims, 6 Drawing Sheets

RIB TAIL-END CONNECTOR FOR AUTOMOBILE SUNSHADE

CROSS-REFERENCE TO RELATED APPLICATIONS

This application claims the benefit of China Patent Application No. 202323497345.6 filed on Dec. 21, 2023, titled "Rib Tail-end Connector for Automobile Sunshade", all the content and modifications of which are incorporated into this application by reference.

TECHNICAL FIELD

The present invention relates to the technical field of automobile sunshade, in particular to a rib tail-end connector for an automobile sunshade.

BACKGROUND

The temperature is high in summer, even though the windows are covered with dark heat insulation film, the temperature inside the car is still very high, especially because the front windshield is covered with light-colored film, and both the steering wheel and the dashboard are hot after exposure. In order to reduce the influence of exposure on the interior parts of the car, at present, sunshades are mostly used to isolate the sun. Putting an automobile sunshade behind the front windshield in the car can insulate the heat, avoid direct light on the dashboard and the steering wheel, and avoid the damage to the dashboard and the aging of the steering wheel under high temperature irradiation.

At present, the connection between the tail end of the umbrella rib and the umbrella cover of the automobile sunshade mostly adopts the insertion through fixed connection between a cloth connector with the umbrella cover to form an insertion groove.

For example, the patent with the publication number of US20020092553A1 in the existing American patents discloses a "Sunshade", and specifically discloses the following technical features: "An attachment mechanism is provided inside each pocket 8 to prevent the outer end 6 from being inadvertently removed from the pocket 8 when the sunshade 1 is in its collapsed condition. Such attachment mechanisms can include a thread attached to the shade 7 and passed through a bore provided in the support 4 adjacent its outer end 6".

It can be seen that the patent can shade the front windshield of an automobile, but the size of the front windshield is also different due to different automobile models, and the structural design of the connector of the existing automobile sunshade makes the automobile sunshade incompatible with shielding the front windshield of different sizes, that is, it cannot be applied to the front windshield of an automobile with different sizes.

Therefore, it is necessary to put forward a new type of automobile sunshade connector, which can be elastically deformed, thus being suitable for automobile front windshields with different sizes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a rib tail-end connector for an automobile sunshade to solve the problem that the existing connector of the automobile sunshade is not suitable for automobile front windshields with different sizes.

In order to achieve the above purpose, the present invention adopts the following technical solution:

a rib tail-end connector for an automobile sunshade, comprising a connector, wherein,
the connector is bendable, and one surface of the connector is provided with a butting convex part, and the butting convex part is used for butting with a rib; and
the butting convex part comprises an insertion part and an installation part which is bendable; and
wherein, the insertion part is used for insertion of the rib, and an elastic member is installed in the installation part, and the elastic member is bendable or unfoldable according to a size of an automobile front windshield.

A rib tail-end connector for an automobile sunshade, comprising a connecting sheet, wherein the connecting sheet comprises a first surface and a second surface which are oppositely arranged; the first surface is used for fixedly connecting with an umbrella cover of the automobile sunshade; the second surface is provided with a butting convex part; the butting convex part comprises an insertion part; one end of the insertion part is provided with an insertion hole; and a rib of an automobile sunshade can be inserted into the insertion part through the insertion hole, wherein,
the butting convex part further comprises an installation part connected with the insertion part, and the installation part is bendable, and an elastic member is installed in the installation part; one end of the elastic member abuts against a tail end of the rib, and the elastic member is bendable or unfoldable according to a size of an automobile windshield.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
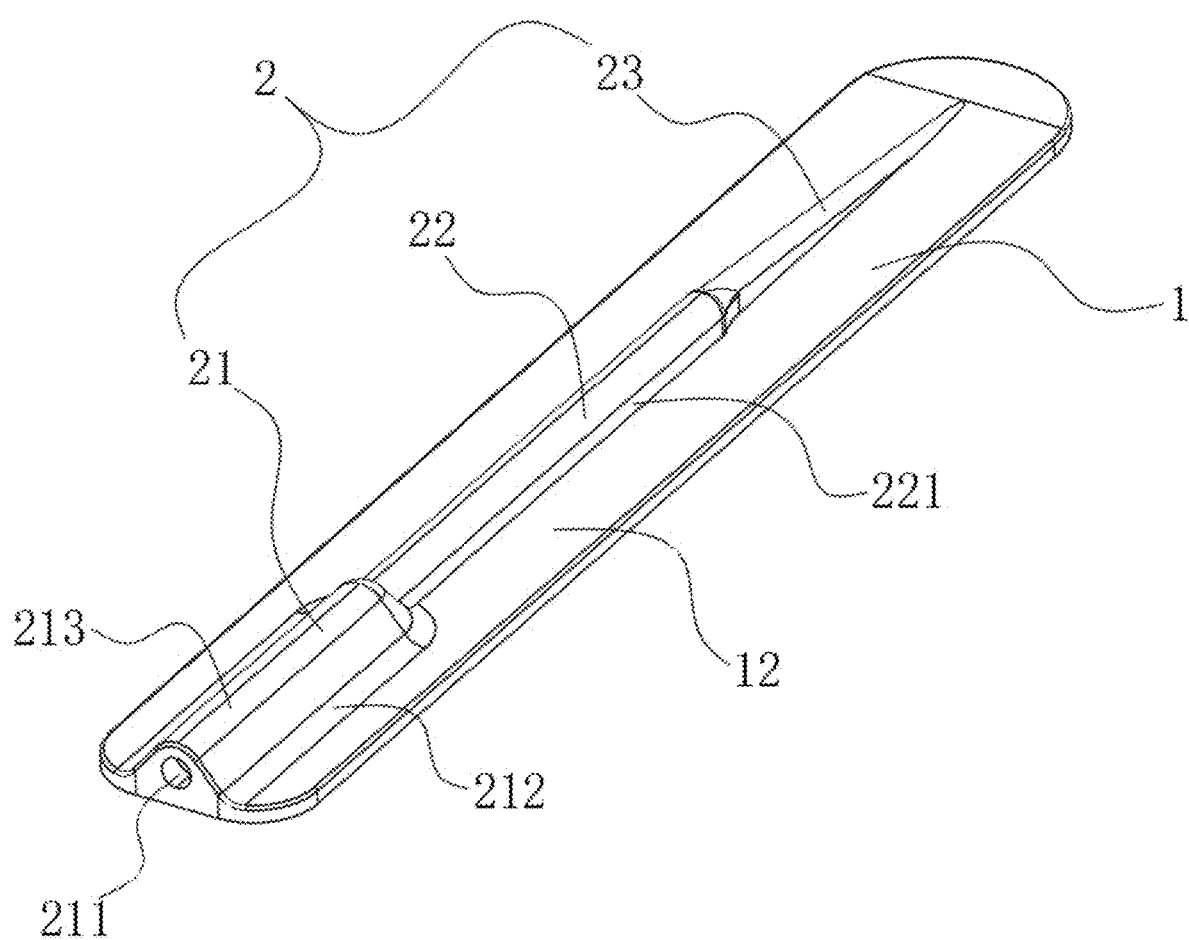
FIG. 1 is a schematic diagram of the three-dimensional structure of the present invention.

In the figures: Connecting sheet (1); First surface (11); Second surface (12); Fixed section (13); Bent section (14) Butting convex part (2); Insertion part (21); Insertion hole (211); Reinforcing seat (212); Head-end convex strip (213); Umbrella rib insertion groove (214); Installation part (22); Middle convex strip (221); Elastic member installation groove (222); tail-end part (23); Tail-end convex strip (231); Seam gap (24); Elastic member (3).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Example 1

Figure 2:
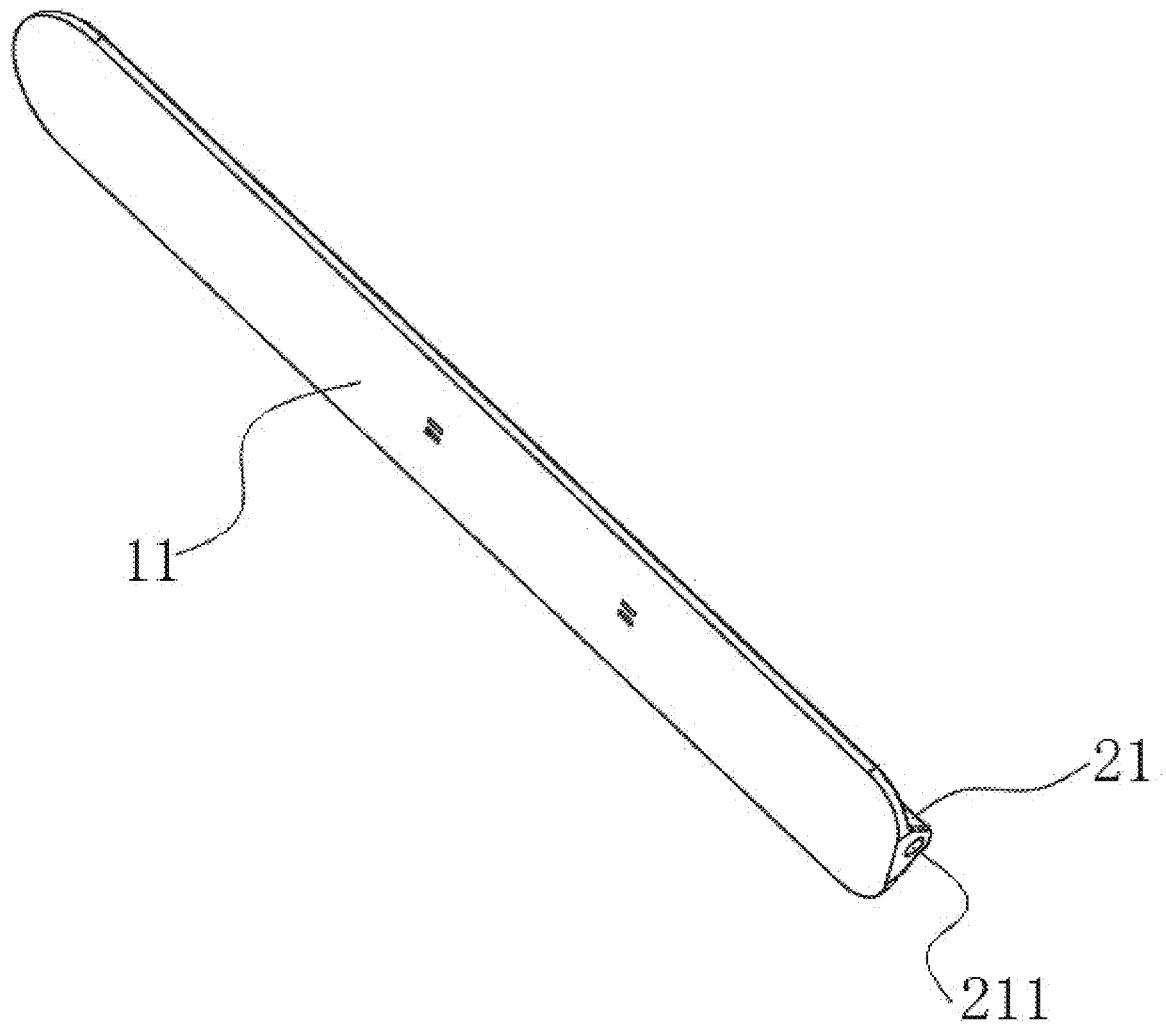
FIG. 2 is a schematic diagram of the three-dimensional structure from another perspective of the present invention.

Please refer to FIG. 1 and FIG. 2, this embodiment provides a rib tail-end connector for an automobile sunshade, which includes a connector which can be bent. One surface of the connector is provided with a butting convex part 2 which is used for butting with a rib. The butting convex part 2 comprises an insertion part 21 and a installation part 22, wherein the insertion part 21 is used for insertion of the rib, and an elastic member 3 is installed inside the installation part 22.

In this embodiment, the elastic member 3 is a spring. In other embodiments, the elastic member 3 can also be spring steel sheet, silicone rubber strip or rubber strip, and any other material or component that can realize elastic deformation.

In this embodiment, both the connector and the butting convex part 2 are flexible or elastic materials, and the preferred materials are TPE, artificial leather, silica gel or rubber materials. All the above materials can make the connector and the butting convex part 2 easily bend when the external force acts, and can be restored to the original state after the external force disappears.

Figure 6:
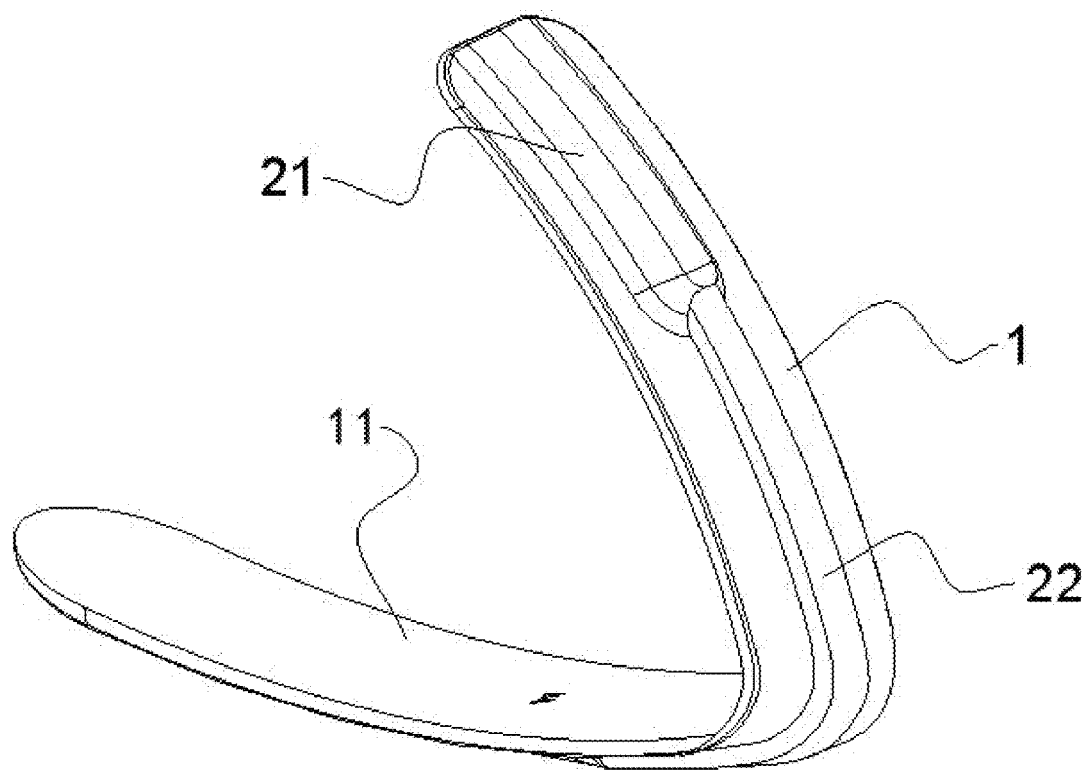
FIG. 6 is a state diagram when the present invention is bent.

Therefore, the bendable connector, the butting convex part 2 and the elastic part 3 with elasticity are matched, so that the connector is bendable and automatically restored, as in shown in FIG. 6.

Figure 3:
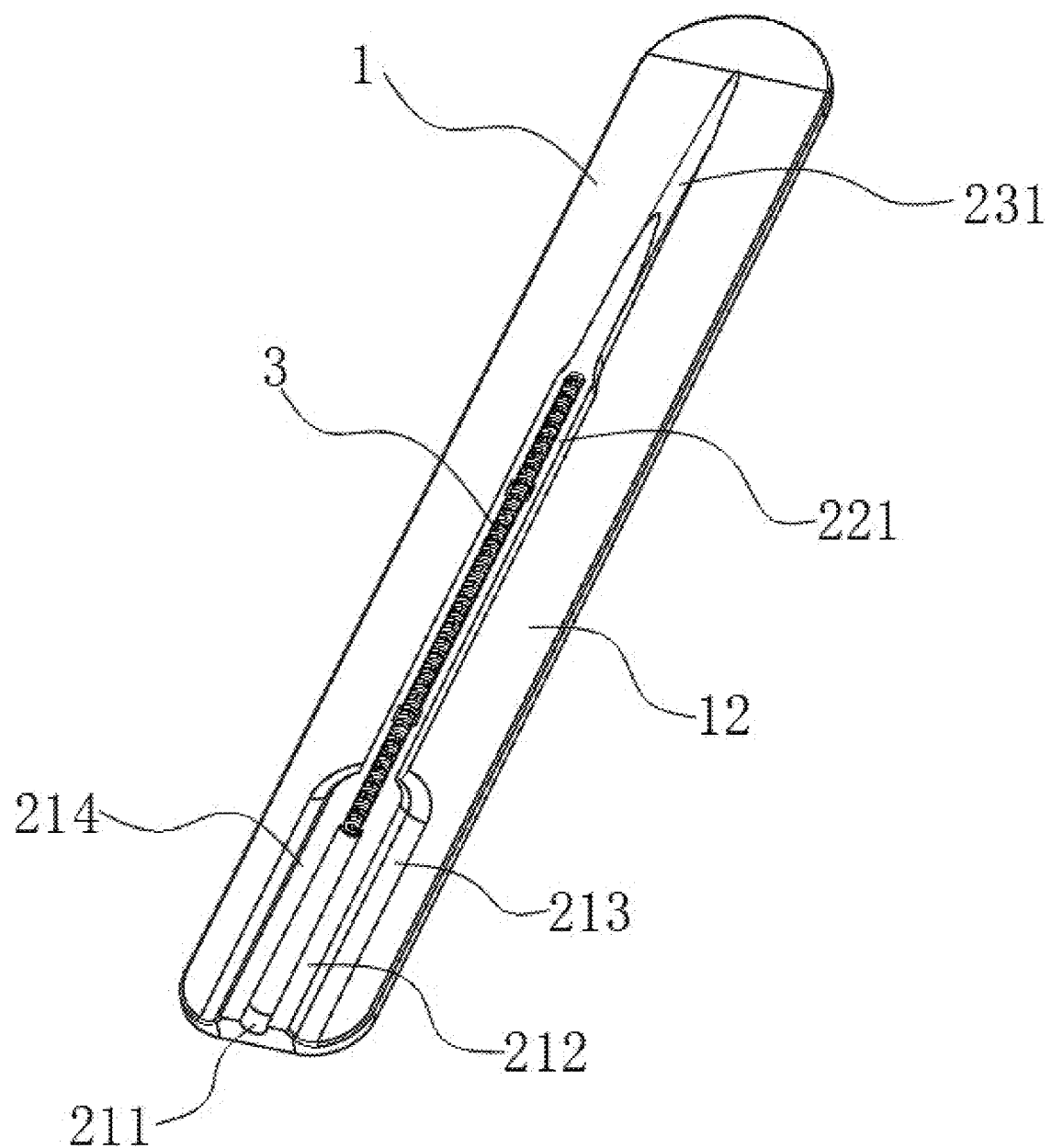
FIG. 3 is a horizontal sectional view of the present invention.

Please refer to FIG. 1, FIG. 2 and FIG. 3. In this embodiment, the connector is preferably a sheet-like connecting sheet 1, and the connecting sheet 1 is provided with at least two working faces, and the butting convex part 2 is installed on one of the working faces. The two working surfaces are respectively set as a first surface 11 and a second surface 12. The first surface 11 is used for fixed connection with the umbrella cover, and the butting convex part 2 is installed on the second surface 12. The butting convex part 2 also includes a tail-end part 23. The insertion part 21, the installation part 22 and the tail-end part 23 are arranged one by one in the axial direction of the connector and integrally formed.

The first surface 11 can be fixedly connected with the umbrella cover of the automobile sunshade, and the preferred connection method can be sewing or bonding. The first surface 11 and the umbrella cover are closely sewn together by sewing, which is not only firm and reliable, but also can effectively prevent falling off or damage caused by long-term use or external environmental factors. The bonding method is to combine the two closely by a glue or an adhesive, which makes the fixing of the connecting sheet 1 more convenient and faster.

According to the above, after the first surface 11 is fixedly connected with the sunshade, the rib of the sunshade can be inserted into the insertion part 21, thereby fixing the rib and the connecting sheet 1 together. Therefore, when the sunshade is used, if the size of the front windshield is small, the installation part 22 on the connecting sheet 1 and the elastic member 3 equipped with it will play an important role. Since the installation part 22 and the elastic member 3 have the ability to bend and deform, they can be flexibly adjusted according to the actual size of the front windshield. When the edge of the automobile sunshade needs to be folded to adapt to the small-sized front windshield, the elastic member 3 can be easily bent and restored to its original state, ensuring the integrity and aesthetics of the sunshade. The bent elastic member 3 not only has elasticity, but also has a certain supporting function. The elastic member 3 cooperates with the installation part 22 and the connecting sheet 1 to form a stable supporting structure. This supporting structure can be firmly abutted against the front windshield of the automobile, providing solid support for the folded umbrella cover. In this way, even if the size of the front windshield is small, the car sunshade can be closely attached to the glass, effectively shielding sunlight and ultraviolet rays, and creating a comfortable driving environment for drivers.

When the front windshield of an automobile is large in size, the elastic member 3 exerts its elastic characteristics, can rebound and expand outward, and at the same time, the connecting sheet 1 also rebounds and recovers. With the extension of the elastic member 3 and the connecting sheet 1, the folded edge of the automobile sunshade can be completely unfolded, and the whole large-size automobile windshield can be covered seamlessly. In this way, whether it is a small size or a large size windshield, the car sunshade can be flexibly adapted to ensure that the driver can enjoy all-round sunshade effect.

In other embodiments of the connector (not shown in the attached drawings), the connector can also be semi-cylindrical, cylindrical, triangular prism and other three-dimensional geometric shapes that are convenient to install on the umbrella cover, and different shapes can be adopted to meet the installation needs and use scenarios of different users.

Figure 4:
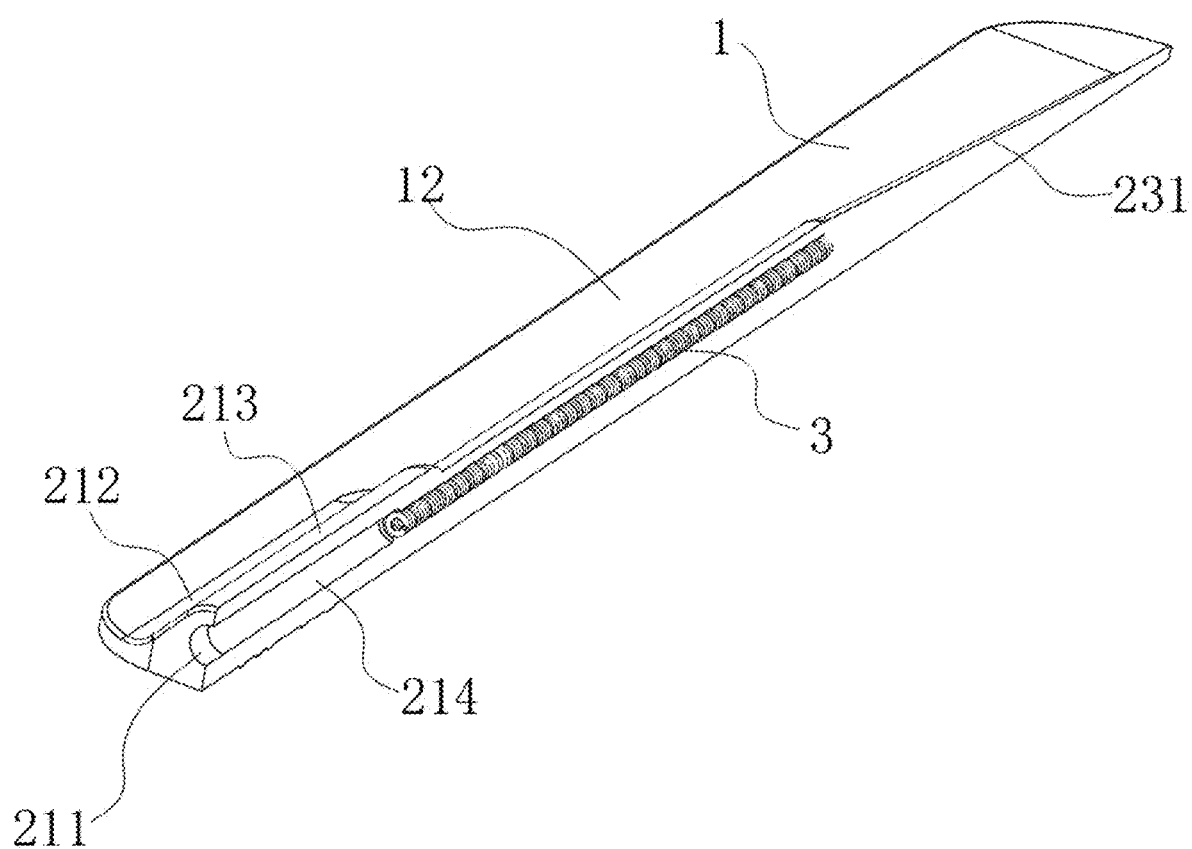
FIG. 4 is a vertical sectional view of the present invention.
Figure 5:
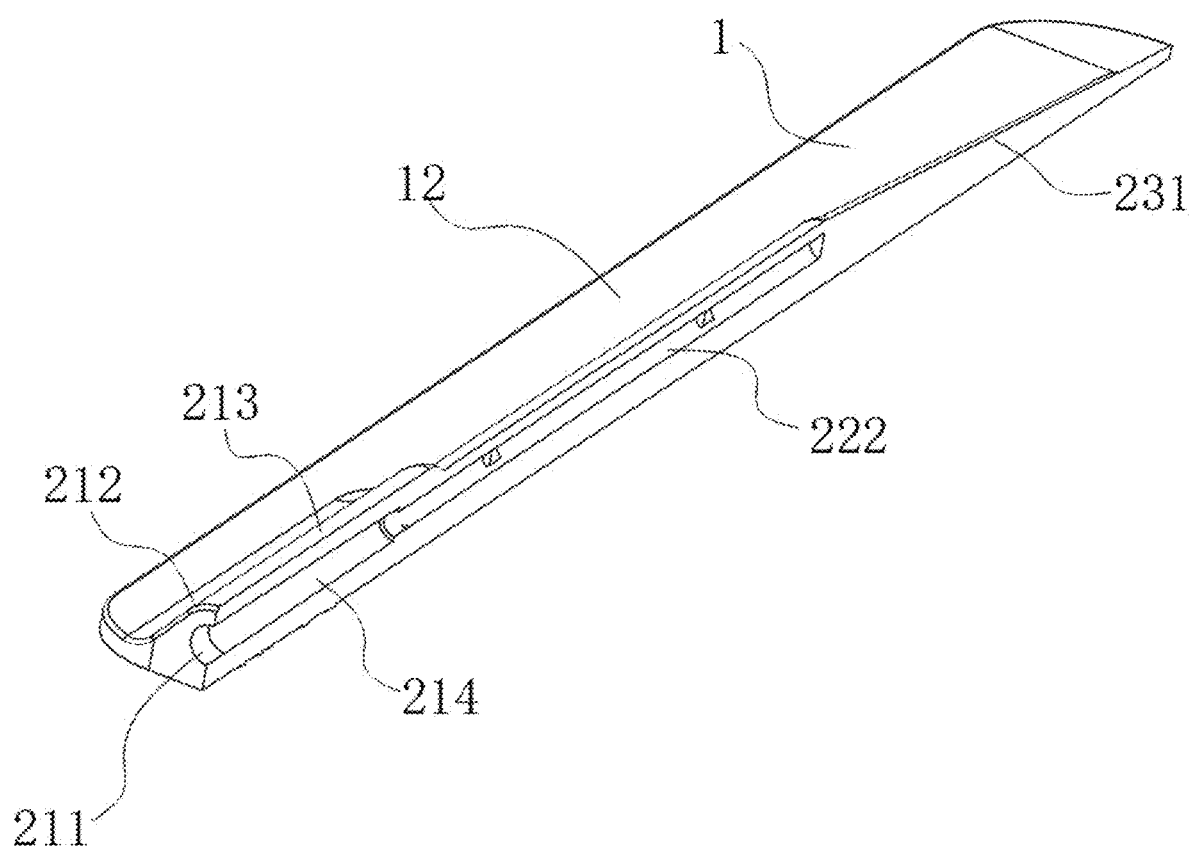
FIG. 5 is a state diagram of FIG. 4 after the elastic member is removed.

According to the above, please refer to FIGS. 4 and 5. The installation part 22 is internally provided with an elastic member installation groove 222, and the elastic member 3 is embedded in the elastic member installation groove 222. A umbrella rib insertion groove 214 is formed in the insertion part 21, and the umbrella rib insertion groove 214 communicates with the elastic member installation groove 222. The other end of the umbrella rib insertion groove 214 is provided with an insertion hole 211, and the insertion hole 211 passes through the insertion part 21.

The rib of the sunshade umbrella can be inserted into the umbrella rib insertion groove 214 through the insertion hole 211, thereby connecting the rib with the connector. The elastic member 3 can be installed in the installation part 22 through the elastic member installation groove 222. By communicating the umbrella rib insertion groove 214, the insertion hole 211 and the elastic member installation groove 222, when the rib is pulled out from the connector, the elastic member 3 can be conveniently taken out from the connector and replaced.

Example 2

This embodiment provides a rib tail-end connector for an automobile sunshade, which comprises a connecting sheet 1, and the connecting sheet 1 comprises a first surface 11 and a second surface 12 which are oppositely arranged, wherein the first surface 11 is used for fixedly connecting with the umbrella cover of the automobile sunshade, and the second surface 12 is provided with a butting convex part 2. As shown in FIGS. 1 and 3, the first surface 11 is the lower surface of the connecting sheet 1, and the second surface 12 is the upper surface of the connecting sheet 1. The first surface 11 is attached and fixed to the umbrella cover of the automobile sunshade by sewing or pasting, and is generally fixed at the edge position near the umbrella cover. The butting convex part 2 is used for butting the tail end of the rib of the automobile sunshade.

In this embodiment, the connecting sheet 1 and the butting convex part 2 are made of soft and bendable materials, such as TPE or artificial leather, so as to facilitate the bending of the connecting sheet 1 and the butting convex part 2 and enable the umbrella cover edge of the sunshade to be folded.

As shown in FIG. 1, the butting convex part 2 of this embodiment includes an insertion part 21, and one end of the insertion part 21 is provided with an insertion hole 211, through which the rib of the automobile sunshade can be inserted into the insertion part 21 and wrapped by the insertion part 21. The rib is connected with the insertion part 21 in an insertion way, which facilitates the installation of the rib and the connector, and at the same time, the insertion part 21 can wrap the tail of the rib, thus preventing the tail of the rib from scratching the front windshield of the automobile.

As shown in FIG. 1, FIG. 3, FIG. 4 and FIG. 5, the butting convex part 2 further includes an installation part 22 connected with the insertion part 21. Specifically, the installation part 22 is arranged at one end of the insertion part 21 facing away from the insertion hole 211.

The installation part 22 is bendable, and an elastic member 3 is installed in that installation part 22, one end of the elastic member 3 abuts against the tail end of the rib accommodated in the insertion part 21, and the elastic member 3 is bendable or unfoldable for use according to the size of the automobile windshield. That is, after the rib is inserted into the insertion part 21, because the installation part 22 is connected with one end of the insertion part 21, the installation part 22 communicates with the inside of the insertion part 21, and the elastic member 3 is installed in the installation part 22, the tail end of the rib inserted into the insertion part 21 will abut against the elastic member 3, so that the elastic member 3 can be prevented from slipping out from the installation part 22 to the insertion part 21. The other end of the elastic member 3 is fixed in contact with the other end of the installation part 22. As one way, the elastic member 3 of this embodiment is a spring. The elastic member 3 can bend or rebound, and the connecting sheet 1 and the installation part 22 are also flexible materials, therefore the connecting sheet 1 and the installation part 22 will also bend or rebound with the elastic member 3. In this way, the same sunshade can be used to shade the front windshield of different sizes.

As shown in FIG. 6, when the width and length of the front windshield of an automobile are small, the connector on the side of the umbrella cover of the automobile sunshade is bent, that is, the connecting sheet 1, the installation part 22 and the elastic member 3 in the installation part 22 are bent together, so that the umbrella cover edge of the sunshade is folded, and the elastic member 3 has a supporting function after bending, so that the bent elastic member 3, the installation part 22 and the connecting sheet 1 are abutted against the front windshield of the automobile to support the folded umbrella. However, when the width and length of the front windshield are large, the connector bent on the side edge of the front automobile sunshade can be unfolded, and the elastic member 3 in the connector will rebound and expand under the elastic force, and the connecting sheet 1 and the installation part 22 will also rebound, so that the folded edge of the whole automobile sunshade can be completely unfolded and covered with the whole large-size automobile windshield. The rib tail-end connector of an automobile sunshade the present application enables the same type of sunshade to adapt to the use of different sizes of front windshields, without the need to configure different types of sunshade for different sizes of front windshields as in the prior art.

Figure 7:
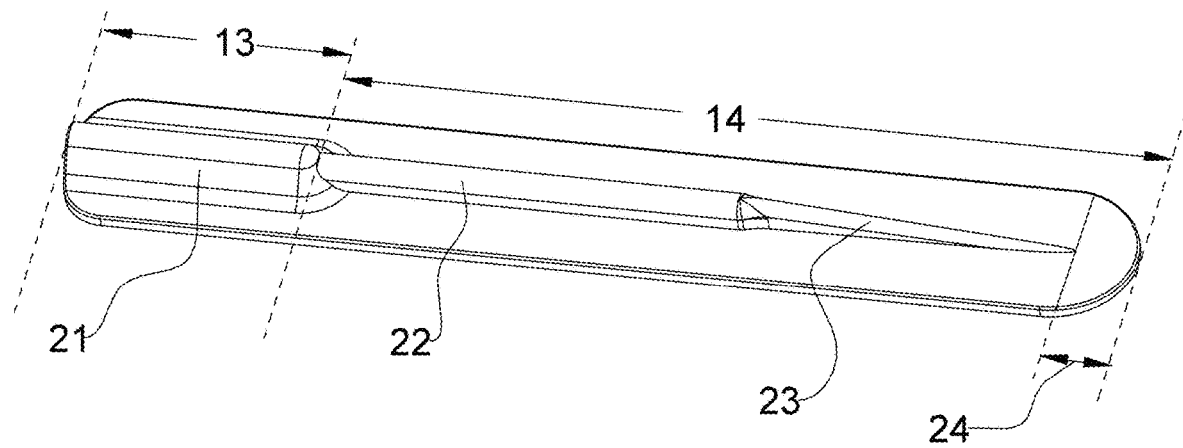
FIG. 7 is a sectional schematic diagram of the present invention.

Specifically, as shown in FIG. 7, the connecting sheet 1 of this embodiment is divided into a fixed section 13 and a bent section 14 along the length direction. The insertion part 21 is arranged in the fixed section 13, and the installation part 22 is arranged in the bent section 14, and the length of the bent section 14 is 10 cm or more.

That is, the connecting sheet 1 of this embodiment is divided into two sections, one of which is an inflexible fixed section 13, and the connecting sheet 1 of this section is provided with an insertion part 21. Because the rib is inflexible, the entire insertion part 21 and the fixed section 13 cannot be flexed after the rib is inserted into the insertion part 21. The other section of the connecting sheet 1 is the bent section 14, because the installation part 22 is arranged on this section, and the flexible elastic member 3 is arranged in the installation part 22, therefore the whole section of the bent section 14 is bendable. In this embodiment, the length of the bent section 14 of the connecting sheet 1 is greater than or equal to 10 cm, so that the foldable size of one side of the umbrella cover in the length or width direction is greater than or equal to 10 cm, so that the total foldable size of the umbrella covers on the two opposite sides in the length or width direction is greater than or equal to 20 cm, while the existing automobile sunshades have small, medium and large sizes; the length and width of a small size is 125 cm*65 cm, the length and width of a medium size is 135 cm*75 cm, and the length and width of a large size is 145 cm*80 cm. The maximum size difference of three types of umbrellas is 145−125=20 cm. Thus, when the rib tail-end connector for the automobile sunshade of this embodiment is installed on a large-sized umbrella, the length of the bent section 14 of the connecting sheet 1 is greater than or equal to 10 cm, and the connecting sheets 1 at two opposite sides in the length direction completely meet the size difference range of 20 cm after being bent, that is, after the connector of this embodiment is installed on a large-sized sunshade, only one large sunshade can completely meet the sunshade requirements of automobile front windshield corresponding to large, medium and small parasols, saving sunshade resources.

Preferably, as shown in FIG. 1, FIG. 3 and FIG. 4, the insertion part 21 of this embodiment includes a reinforcing seat 212 and a head-end convex strip 213 arranged on the reinforcing seat 212 and extending along the length direction of the connecting sheet 1. A umbrella rib insertion groove 214 is formed in the head-end convex strip 213, and an insertion hole 211 communicating with the umbrella rib insertion groove 214 is formed at one end of the head-end convex strip 213, and a rib is inserted into the umbrella rib insertion groove 214 from the insertion hole 211 to be wrapped and fixed. The reinforcing seat 212 increases the width of the whole insertion part 21 and the thickness of the head-end convex strip 213 to ensure sufficient strength to wrap and support the ribs. The aperture of the umbrella rib insertion groove 214 can be the same as or slightly larger than the diameter of the rib, so as to tightly wrap the rib and prevent the rib from loosening.

Preferably, the installation part 22 of this embodiment includes a middle convex strip 221, and an elastic member installation groove 222 is formed in the middle convex strip 221; the elastic member 3 is installed in the elastic member installation groove 222, and the elastic member installation groove 222 is communicated with the umbrella rib insertion groove 214. On the one hand, the middle convex strip 221 is used to install the elastic member 3, and on the other hand, it can improve the strength of the middle part of the connecting sheet 1. The elastic member installation groove 222 communicates with the umbrella rib insertion groove 214, on the one hand, for inserting the elastic member 3, and on the other hand, after the rib is inserted into the umbrella rib insertion groove 214, the end of the rib elastically abuts against the elastic member 3.

Preferably, the aperture of the umbrella rib insertion groove 214 of this embodiment is larger than that of the elastic member installation groove 222, so as to facilitate the smooth installation of the elastic member 3. Preferably, after the elastic member 3 of this embodiment is installed in the elastic member installation groove 222, one end of the elastic member 3 facing the umbrella rib insertion groove 214 is located at the connection between the umbrella rib insertion groove 214 and the elastic member installation groove 222, or one end of the elastic member 3 facing the umbrella rib insertion groove 214 partially extends into the umbrella rib insertion groove 214, so as to facilitate the abutment of the tail end of the rib with the elastic member 3.

Further, the butting convex part 2 of this embodiment further includes a tail-end part 23 connected with the installation part 22, and the tail-end part 23 includes a solid tail-end convex strip 231, and the tail-end convex strip 231 blocks the end of the elastic member installation groove 222. The tail-end convex strip 231 is connected to one end of the installation part 22 facing away from the insertion part 21. The tail-end convex strip 231 is a solid structure, which is arranged along the length direction of the connecting sheet 1, and can improve the strength of the tail of the connecting sheet 1. Because the connector of this embodiment has to adapt to different sizes of front windshields, the overall size of the connecting sheet 1 will be relatively long, the head of the connecting sheet 1 is supported by the insertion part 21 to ensure the strength of the head of the connecting sheet 1; the middle part of the connecting sheet 1 is supported by the middle convex strip 221 and the elastic member 3 to ensure the strength of the middle part of the connecting sheet 1, and the tail part of the connecting sheet 1 is provided with a solid tail-end convex strip 231 to support and ensure the strength of the tail part of the connecting sheet 1, so as to prevent the tail part of the connecting sheet 1 from being too soft.

At the same time, the tail-end convex strip 231 is a solid structure, which can block the end of the elastic member installation groove 222, so as to resist the end of the elastic member 3 far from the umbrella rib insertion groove 214. The tail-end convex strip 231 of this embodiment can also be bent.

Preferably, the width of the tail-end convex strip 231 of this embodiment gradually decreases along the length direction of the connecting sheet 1. In this way, the closer the umbrella cover of the sunshade is to the edge part, the easier it is to be folded.

Please continue to refer to FIG. 1. In this embodiment, the insertion part 21, the installation part 22 and the tail-end part 23 are connected into an integrated structure and extend along the length direction of the connecting sheet 1, thus ensuring the strength of the connecting sheet 1.

Further, the connecting sheet 1 is integrally formed with the butting convex part 2, which is convenient for processing and reduces the parts of the whole connector.

In this embodiment, the length of the insertion part 21, the length of the installation part 22 and the length of the tail-end part 23 are 3-4 cm, 5-7 cm and 4-5 cm, respectively. In order to meet the use requirements of automobile front windshield in the current range of 20 cm, preferably, the length of the insertion part 2121 is 3 cm, the length of the installation part 2222 is 5.5 cm, and the length of the tail-end part 2323 is 4 cm. It can be understood that in other embodiments, the respective lengths of the insertion part 21, the installation part 22 and the tail-end part 23 can be configured according to requirements to meet the use requirements of automobile windshields with different sizes.

As shown in FIG. 6, in this embodiment, a seam gap 24 is formed from the tail-end part 23 to the end of the connecting sheet 1, and the length of the seam gap 24 is 1-2 cm. The arrangement of the seam gap 24 facilitates the seam connection between the tail of the connecting sheet 1 and the umbrella cover.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks 10 or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A rib tail-end connector for an automobile sunshade, comprising a connecting sheet, wherein the connecting sheet comprises a first surface and a second surface which are oppositely arranged, the first surface is used for fixedly connecting with an umbrella cover of the automobile sunshade, the second surface is provided with a butting convex part, the butting convex part comprises an insertion part, one end of the insertion part is provided with an insertion hole, and a rib of an automobile sunshade can be inserted into the insertion part through the insertion hole, wherein, the butting convex part further comprises an installation part connected with the insertion part, and the installation part is bendable, and an elastic member is installed in the installation part, one end of the elastic member abuts against a tail end of the rib, and the elastic member is bendable or unfoldable according to a size of an automobile windshield.

2. The rib tail-end connector for an automobile sunshade according to claim 1, wherein the connecting sheet is divided into a fixed section and a bent section along a length direction, the insertion part is arranged in the fixed section, and the installation part is arranged in the bent section, and a length of the bent section is greater than or equal to 10 cm.

3. The rib tail-end connector for an automobile sunshade according to claim 1, wherein the insertion part comprises a reinforcing seat and a head-end convex strip arranged on the reinforcing seat and extending along the length direction of the connector, an umbrella rib insertion groove is formed in the head-end convex strip, and one end of the head-end convex strip is provided with an insertion hole communicated with the umbrella rib insertion groove.

4. The rib tail-end connector for an automobile sunshade according to claim 3, wherein the installation part comprises a middle convex strip, an elastic member installation groove is formed in the middle convex strip, the elastic member is installed in the elastic member installation groove, and the elastic member installation groove is communicated with the umbrella rib insertion groove.

5. The rib tail-end connector for an automobile sunshade according to claim 1, wherein the elastic member is a spring.

6. The rib tail-end connector for an automobile sunshade according to claim 4, wherein the butting convex part further comprises a tail-end part connected with the installation part, and the tail-end part comprises a solid tail-end convex strip which blocks an end of the elastic member installation groove.

7. The rib tail-end connector for an automobile sunshade according to claim 6, wherein the insertion part, the installation part and the tail-end part are connected into an integrated structure.

8. The rib tail-end connector for an automobile sunshade according to claim 6, wherein a width of the tail-end convex strip gradually decreases along the length direction of the connector.

9. The rib tail-end connector for an automobile sunshade according to claim 1, wherein the connecting sheet and the butting convex part are integrally formed.

10. The rib tail-end connector for an automobile sunshade according to claim 6, wherein the insertion part has a length of 3-5 cm, the installation part has a length of 5-7 cm, and the tail-end part has a length of 4-5 cm.

11. A rib tail-end connector for an automobile sunshade, comprising a connector, wherein, the connector is bendable, and one surface of the connector is provided with a butting convex part, and the butting convex part is used for butting with a rib; and
the butting convex part comprises an insertion part and an installation part which is bendable; and
wherein, the insertion part is used for insertion of the rib, and an elastic member is installed in the installation part, and the elastic member is bendable or unfoldable according to a size of an automobile front windshield.

12. The rib tail-end connector for an automobile sunshade according to claim 11, wherein the connector is a sheet-shaped connecting sheet, and the connecting sheet is provided with at least two working faces, and the butting convex part is installed on one of the working faces.

13. The rib tail-end connector for an automobile sunshade according to claim 12, wherein the two working surfaces are respectively set as a first surface and a second surface, the first surface is used for fixed connection with an umbrella cover, and the butting convex part is installed on the second surface.

14. The rib tail-end connector for an automobile sunshade according to claim 11, wherein the elastic member is a spring, and both the connector and the butting convex part are made of flexible or elastic materials.

15. The rib tail-end connector for an automobile sunshade according to claim 11, wherein the butting convex part further comprises a tail-end part, and the insertion part, the installation part and the tail-end part are arranged one by one in an axial direction of the connector and integrally formed.

16. The rib tail-end connector for an automobile sunshade according to claim 15, wherein an elastic member installation groove is formed in the installation part, and the elastic member is embedded in the elastic member installation groove.

17. The rib tail-end connector for an automobile sunshade according to claim 16, wherein an umbrella rib insertion groove is formed in the insertion part, and the umbrella rib insertion groove is communicated with the elastic member installation groove.

18. The rib tail-end connector for an automobile sunshade according to claim 17, wherein the other end of the umbrella rib insertion groove is provided with an insertion hole, and the insertion hole penetrates through the insertion part.

* * * * *